Patented Dec. 2, 1952

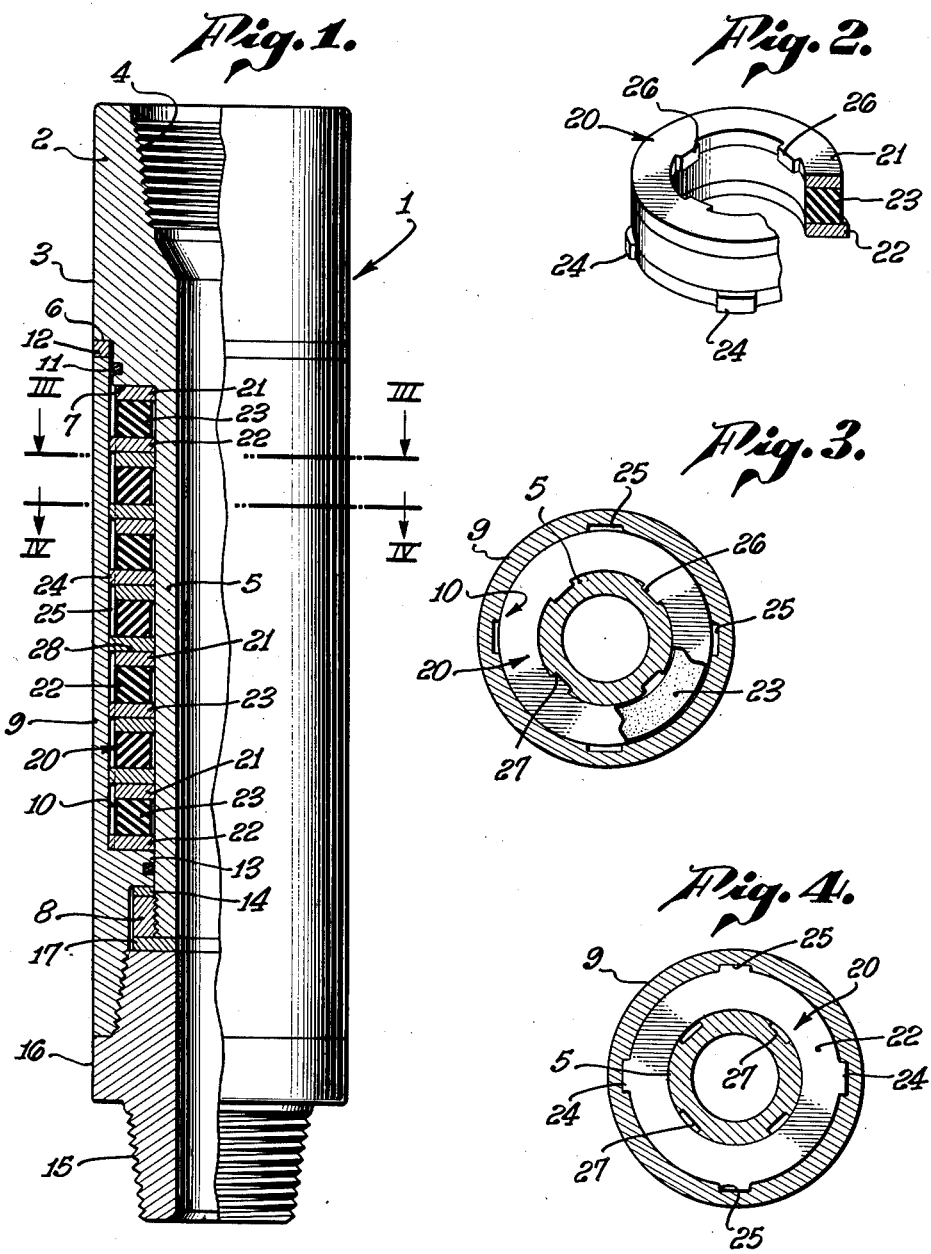

2,620,165

UNITED STATES PATENT OFFICE 2,620,165

WELL DRILLING TRANSMISSION POWER MEANS

Charles S. Crickmer, South Pasadena, Calif., assignor to C. A. Miketta, Los Angeles, Calif.

Application January 31, 1949, Serial No. 73,742

1 Claim. (Cl. 255—28)

This invention relates to an improved well drilling power transmission or coupling device particularly adapted to transmit torque and to absorb torsional shocks and vibrations from a drilling stem to a driven drill bit or well tool through the medium of a resilient material.

In well drilling practice, a drilling stem comprising a plurality of interconnected lengths of hollow pipe is rotationally driven from the ground surface for rotating a well tool such as a drill bit located deep in the earth. The rotation of such a long heavy drilling stem and the pressure applied to the driven well tool which is in contact with rock or other strata of varying characteristics creates severe detrimental vibrations and shocks in the drilling stem. Vibrations and shocks thus caused produce undesirable stresses on drill collars and tool joints connecting portions of the drilling stem, and result in decreased life of said joints and increase the danger of jumped pins and twist-offs.

Utilization of a resilient material such as a rubber composition in the drilling stem has been proposed in various ways to cushion and dampen the shocks thus created during rotation of the drilling stem. In prior proposed arrangements the resilient material for transmitting torque and absorbing shocks usually consisted of a single member interposed between the driving and driven elements and was exposed to the deteriorating action of well fluids such as drilling fluid, oil, and mud. The action of the well fluids would produce swelling of the resilient member and rapidly reduce its life thus making the resilient member incapable of transmitting the forces applied to it. The prior proposed constructions have not been used to any appreciable extent.

It is therefore an object of this invention to provide an improved well drilling power transmission and coupling device for use on a drilling stem wherein driving forces will be transmitted through a resilient material in a novel manner and the material will be protected from deteriorating action of well fluids.

Another object of this invention is to provide an improved coupling device which will substantially prevent or eliminate the transmission of torsional shocks and vibrations from the drill tool to the drill stem.

Still another object of this invention is to provide a torque transmitting device which will absorb torsional shocks and vibrations for protecting the drill stem and thus materially increase the life of tool joints, shell couplings, and reduce to a minimum the number of jumped pins and twist-offs.

This invention also contemplates a power transmission device utilizing a plurality of torque transmitting units each adapted to transmit torque forces through resilient material and also through resistance created by frictional contact between adjacent units.

A further object of this invention is to provide a power transmission device having inner and outer hollow sleeve members arranged to provide an annular chamber therebetween and a plurality of superposed torque transmitting units within the chamber intersplined with said members and normally under longitudinal compression whereby turning forces may be transmitted from the inner member to the outer member through the interposed torque units by means of resilient material utilized in said torque units and by frictional engagement between adjacent torque units.

Other objects and advantages of this invention will be readily apparent from the following description of the drawings.

In the drawings:

Fig. 1 is a side view of a well drilling coupling device embodying this invention, said view being half in section to more clearly show the internal arrangement of the device.

Fig. 2 is a perspective view of a torque unit utilized in Fig. 1, a quarter section being cut away to better show its construction.

Fig. 3 is a transverse sectional view taken in the plane indicated by line III—III of Fig. 1.

Fig. 4 is a transverse sectional view taken in the plane indicated by the line IV—IV of Fig. 1.

Referring particularly to Fig. 1, the power transmission or coupling device generally indicated at 1 may be preferably connected to the drilling stem adjacent the drill bit. If desired the coupling device may be used in other portions of the drilling stem in addition to the connection adjacent the drill bit.

The coupling 1 may comprise a sub-element 2 having an upper portion 3 of substantially the same diameter as the drill stem and adapted for connection therewith by means of the internal tapered threads 4. Downwardly depending from the upper portion 3 is a reduced inner hollow sleeve member 5 having an external diameter less than the external diameter of the upper portion 3. The reduction in diameter may be progressive by the formation of an outer annular shoulder 6 and an inner annular shoulder 7. At the lower end of the inner member 5 may be threaded a radially outwardly extending ring 8 presenting a bottom annular face adapted to be positioned substantially flush with the bottom annular face of the inner member 5.

An outer hollow sleeve member 9 coaxially surrounds said inner member 5 and is spaced therefrom to provide an annular chamber 10. The top edge portion of outer member 9 extends above the inner annular shoulder 7 for sealing engagement between the outer member 9 and the inner member 5. This sealing engagement may be provided by any suitable means such as O ring 11 carried in an annular groove in the member 5 for bearing against the adjacent portion of the inner face of the outer member 9, and by a mud packing ring 12 compressed between the top edge of outer member 9 and the outer shoulder 6. Adjacent its bottom portion the outer member 9 is provided with a radially inwardly extending flange 13 which may overlie the annular ring 8 and be spaced therefrom to afford positioning therebetween of an annular packing ring 14. An O ring carried in an annular groove formed in the internal face of the flange 13 may bear against the adjacent portion of the outer face of the inner member 5 to afford sealing engagement therewith. The chamber 10 is thus substantially sealed and enclosed to prevent entrance of well fluids therein.

The lower end of outer member 9 may be provided with tapered internal threads to afford threaded engagement with a driven coupling member 15, said coupling 15 having a central shoulder 16 adapted to contact the lower annular edge portion of the outer member 9 when the threaded connection is drawn tight. The lower portion of the coupling 15 may be provided with a pin connection or tapered threaded portion adapted for threaded engagement with a drill bit or other drill tool. A thrust washer 17 may be interposed between the top annular face of the coupling 15 and the opposed bottom annular faces of the inner member 5 and ring 8. It will be noted that longitudinal movement between sleeve or cylinder portions 5 and 9 is limited by cooperation of 8 and 13.

Means for transmitting torque from the driving inner member 5 to the driven outer member 9 are provided by a plurality of torque units 20 which are contained within the sealed chamber 10 and are superposed one on top of the other. Each torque unit includes spaced metallic rings 21 and 22 and a ring of any suitable resilient material 23 of rubber composition which is particularly adapted for transmitting turning effort or torque such as neoprene rubber. The resilient ring 23 may be secured to adjacent faces of the metallic rings 21 and 22 in any suitable manner preferably as by vulcanizing or by bonding.

As best seen in Fig. 4, the metallic ring 22 of each unit is provided with radially outwardly projecting fingers or lugs 24 which are adapted to be accommodated within correspondingly spaced longitudinally extending spline grooves 25 formed in the internal cylindrical splined face of the outer sleeve member 9. Likewise, as best seen in Fig. 3, each metallic ring 21 is provided with a plurality of spaced radially inwardly directed lugs or fingers 26 adapted to be accommodated within longitudinally extending spaced grooves 27 formed in the external cylindrical splined face of the inner sleeve member 5. It will thus be apparent that each of the torque units is provided with interlocking engagement with both the inner and outer sleeve members and that turning forces transmitted from the inner member 5 will cause rotation of the metallic ring 21 which will transmit the turning force through the ring of bonded resilient material to the other metallic ring 22 which has interlocking engagement with the outer member 9 and thus drive the outer member.

It should be noted that the torque units 20 completely fill the chamber 10 being seated on the flange 13 and contacting the shoulder 7. The units are normally placed under compression in the direction of the longitudinal axis of the device 2. It will thus be apparent that the adjacent contacting rings of adjacent units will normally be provided with frictional contact between the opposed faces as at 28, and said frictional contact will also tend to transmit torque because of the interlocking engagement of the adjacent rings with different sleeve members 5 and 9.

Assembly of the power transmission device is readily understood from the drawings. The torque units 20 may be positioned or stacked one on top of each other within the sleeve member 9. The inner sleeve member 5 is then telescoped therewithin until its threaded end projects below the flange 13. The ring 8 may then be threaded to the bottom of inner member 5, the thrust ring 17 positioned, and the coupling 15 then threaded to the bottom of the outer member 9. The coupling 15 is tightened until its central shoulder contacts the bottom edge of the outer member 9 in which position the torque units are placed under some compression.

Vibrations and shocks caused by a well tool in operative contact with the strata in which it is being used will be transmitted from the driven outer sleeve member 9 to the resilient material in each torque unit 20 through the splined connection of the torque units with the outer member and through the bonding of the resilient material to the metallic rings 22. The resilient material is characterized by its capacity of substantially absorbing such shocks and vibrations and thus virtually reducing to a minimum their transmission to the driving drill stem. It should be particularly noted that the plurality of superposed torque units being normally under compression, also tend to dampen such vibrations and shocks through frictional contact of the metallic rings of adjacent units. The co-action of the frictional dampening of such shocks or vibrations, in addition to the cushioning of such shocks by the resilient material reduces to a minimum the transmission of such shocks and vibrations to the drill stem. It should be noted that in the arrangement of torque units of this invention, the plurality of torque units provide dampening action by frictional contact between a plurality of different annular surfaces and absorption of said vibrations through a plurality of resilient members.

In installations where it is desired to use more than one coupling device of the character described above, it may be desirable to use torque units having resilient material of different characteristics than those utilized in the coupling device adjacent to the well tool. Likewise, the dampening of vibrations by the frictional contact between adjacent units may be varied by changing the amount of compression under which the units are placed when the device is assembled.

It will thus be readily apparent to those skilled in the art that this invention provides an efficient vibration dampening and absorbing coupling device for use in a drill stem which may be readily adaptable for absorbing undesirable shocks and vibrations when different conditions are encountered in the drilling operation. It should be noted that the torque units are of simple design and may be easily manufactured and that sets of such torque units may be made, each set having resilient material of different shock absorbing characteristics.

It will be readily understood that the description of this invention is illustrative only and that modifications and changes may be made, and it is not intended that this invention be limited except by the scope of the appended claim hereto.

I claim:

In a coupling device for use in a drilling string in a well for transmitting rotation and absorbing and dampening torsional shocks and vibrations: a driving portion and a driven portion; an inner hollow sleeve member connected to one of said portions and having outwardly progressing stepped annular shoulders at one end and having external threads at its other end; said inner sleeve member being provided with external longitudinally extending splines; an outer hollow sleeve member connected to the other of said portions and having a radially inwardly extending flange adjacent to one end defining a port through which the inner sleeve member extends and having an open opposite end cooperative with the outermost shoulder of the inner sleeve member; sealing means between said outermost shoulder and the open end of the outer member, and between the flange and inner sleeve member to define an enclosed annular sealed chamber; means carried on the threaded end of said inner sleeve member below said flange for axially positioning said outer sleeve member with respect to said inner sleeve member; a plurality of torque transmitting ring-like units positioned one above the other within said annular chamber, said units lying in planes perpendicular to the longitudinal axis of said members, each unit comprising an annulus of resilient material normally under longitudinal compression and a pair of metallic rings bonded to opposite faces of said annulus, one of each pair of rings being splined into one of said sleeve members and the other ring of each pair being splined into the other of said sleeve members; the adjacent rings of adjacent units having interlocking engagement with different sleeve members and being in frictional contact; said outer sleeve positioning means being adjustable to initially compress the resilient annuli of said ring-like units and to urge the adjacent rings of adjacent units into predetermined frictional contact whereby torsional shocks and vibrations are absorbed by said resilient member and dampened by the frictional contact of the adjacent rings of adjacent units.

CHARLES S. CRICKMER.

REFERENCES CITED

The following references are of record in the file of this patent:

UNITED STATES PATENTS

| Number | Name | Date |
|---|---|---|
| 1,960,688 | Archer | May 29, 1934 |
| 2,016,154 | McWhirter | Oct. 1, 1935 |
| 2,025,100 | Gill et al. | Dec. 24, 1935 |
| 2,067,284 | Pearce | Jan. 12, 1937 |
| 2,212,153 | Eaton et al. | Aug. 20, 1940 |
| 2,235,605 | Bugatti | Mar. 18, 1941 |
| 2,325,132 | Haushalter et al. | July 27, 1943 |